(12) United States Patent
Morimoto et al.

(10) Patent No.: US 7,398,975 B2
(45) Date of Patent: Jul. 15, 2008

(54) ROTATION SHAFT SEAL

(75) Inventors: Keizo Morimoto, Arida (JP); Takeshi Baba, Arida (JP)

(73) Assignee: Mitsubishi Cable Industries, Ltd., Itami-shi (JP)

( * ) Notice: Subject to any disclaimer, the term of this patent is extended or adjusted under 35 U.S.C. 154(b) by 15 days.

(21) Appl. No.: 11/546,282

(22) Filed: Oct. 12, 2006

(65) Prior Publication Data
US 2007/0024008 A1    Feb. 1, 2007

Related U.S. Application Data

(62) Division of application No. 10/849,876, filed on May 21, 2004, now Pat. No. 7,134,670.

(30) Foreign Application Priority Data

May 29, 2003 (JP) .............................. 2003-152361
Jun. 10, 2003 (JP) .............................. 2003-165544

(51) Int. Cl.
*F16J 15/32* (2006.01)
(52) U.S. Cl. ...................................... 277/549; 277/572
(58) Field of Classification Search ................ 277/549, 277/551, 558, 572, 576–577, 584
See application file for complete search history.

(56) References Cited

U.S. PATENT DOCUMENTS

| 2,465,175 | A | * | 3/1949 | Schwarz et al. ............. 277/562 |
| 2,743,951 | A | * | 5/1956 | Ayres et al. ................. 277/560 |
| 2,926,035 | A | * | 2/1960 | Peickii et al. ............... 277/572 |
| 4,005,769 | A | | 2/1977 | Itoh ............................ 188/315 |
| 4,208,057 | A | * | 6/1980 | Messenger ................... 277/309 |
| 4,542,811 | A | | 9/1985 | Miura ..................... 188/322.17 |
| 4,623,153 | A | | 11/1986 | Nagasawa ................... 277/551 |
| 4,848,776 | A | | 7/1989 | Winckler ....................... 277/23 |
| 5,110,142 | A | | 5/1992 | Szott ........................... 277/330 |
| 5,582,412 | A | | 12/1996 | Sabo Filho ................... 277/37 |
| 5,975,534 | A | | 11/1999 | Tajima et al. ............... 277/353 |
| 6,206,380 | B1 | | 3/2001 | Miyazaki ..................... 277/551 |
| 6,257,587 | B1 | | 7/2001 | Toth et al. ................... 277/309 |
| 6,450,503 | B1 | | 9/2002 | Dossena et al. ............. 277/572 |

FOREIGN PATENT DOCUMENTS

| JP | 01030975 A | 2/1989 |
| JP | 2003-97723 | 4/2003 |

* cited by examiner

*Primary Examiner*—Vishal Patel
(74) *Attorney, Agent, or Firm*—Kratz, Quintos & Hanson, LLP

(57) ABSTRACT

A rotation shaft seal provided with a rubber sealing portion which contacts a surface of a rotation shaft and an outer case to which the rubber sealing portion is unitedly fixed. The outer case has an inner brim portion on an inner end portion on a sealed fluid side. The inner brim portion is covered by the rubber sealing portion. A sliding portion is disposed on an axis-orthogonal face including the inner brim portion.

1 Claim, 16 Drawing Sheets

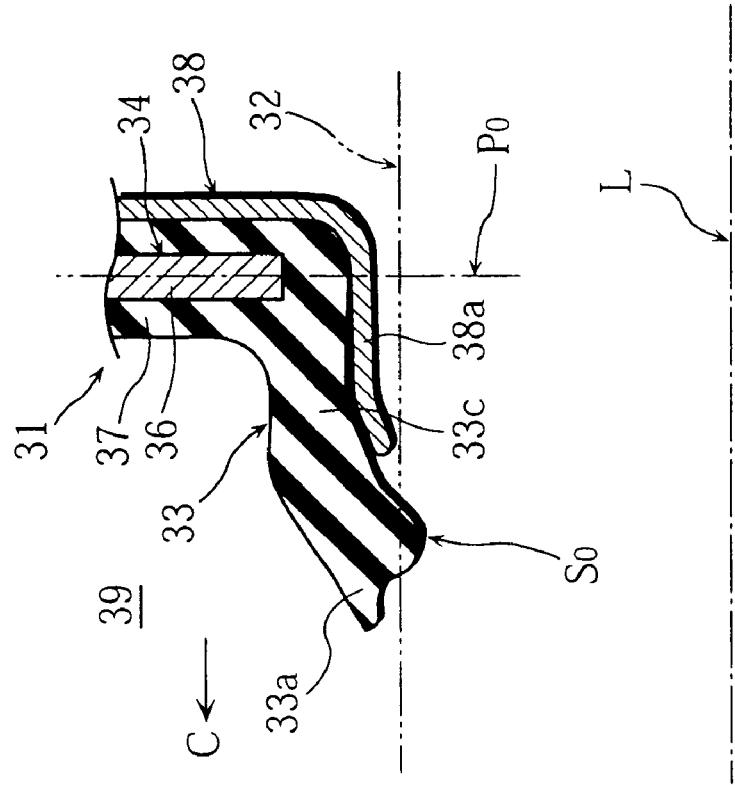
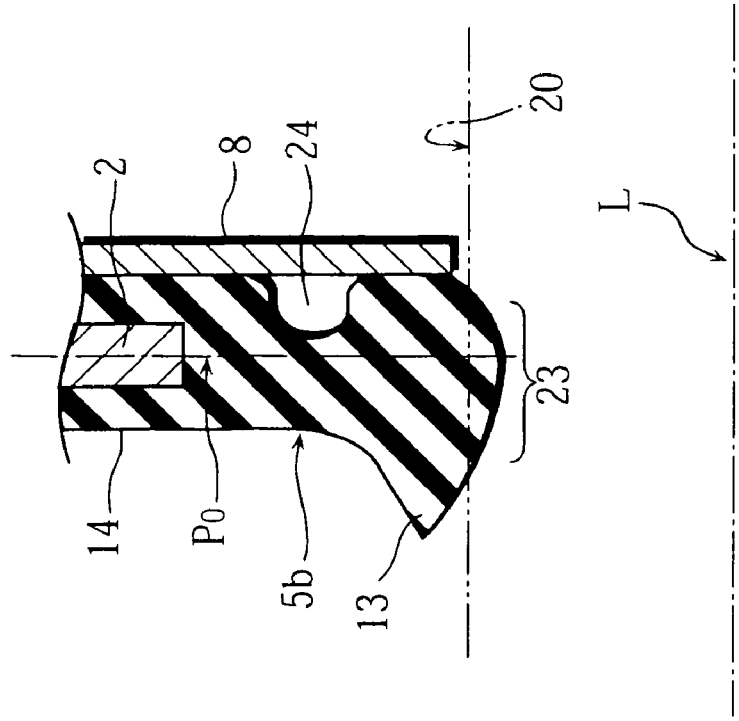

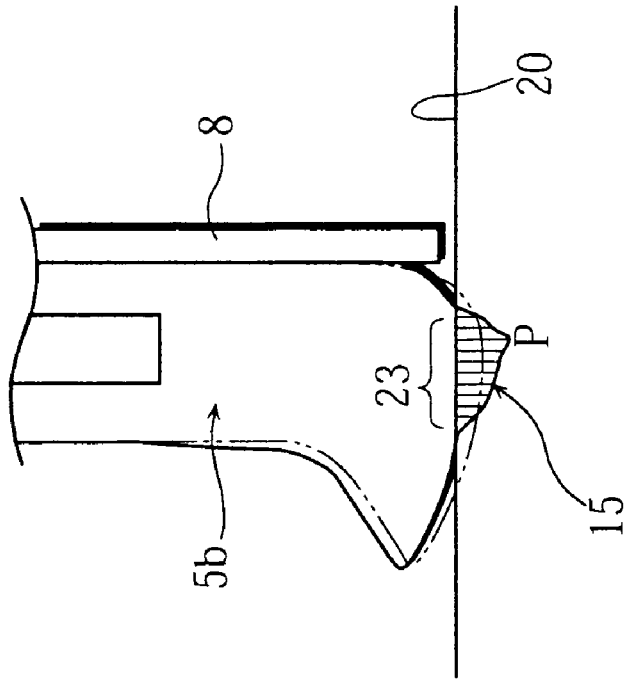
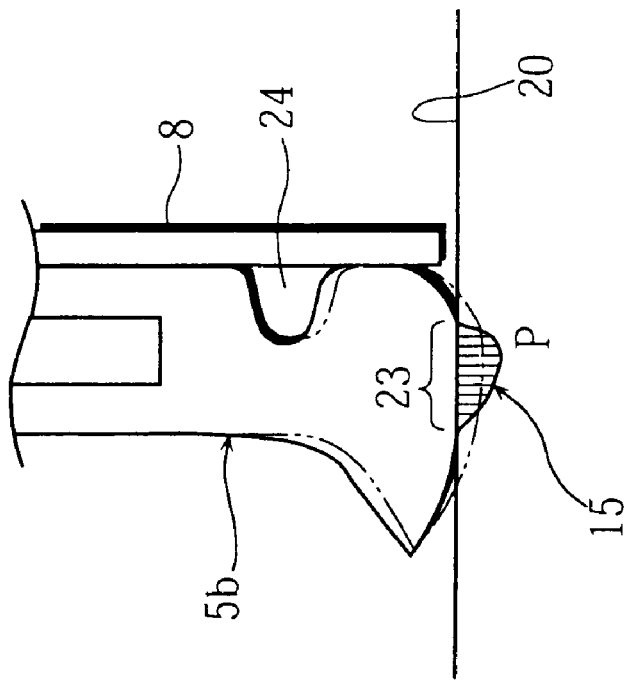

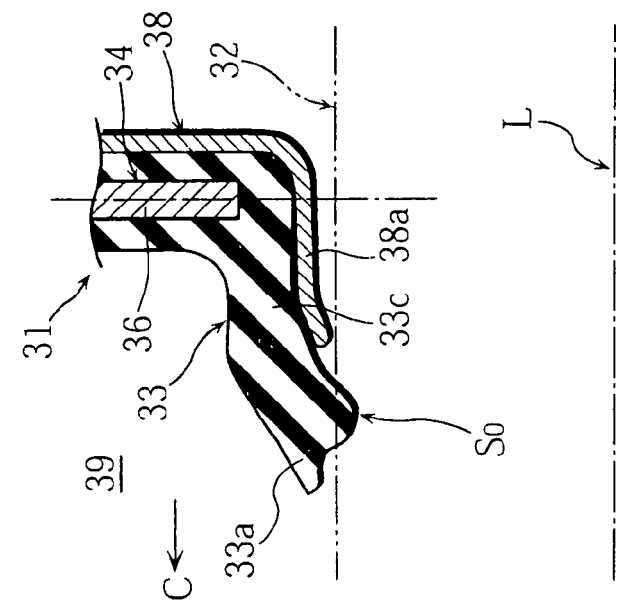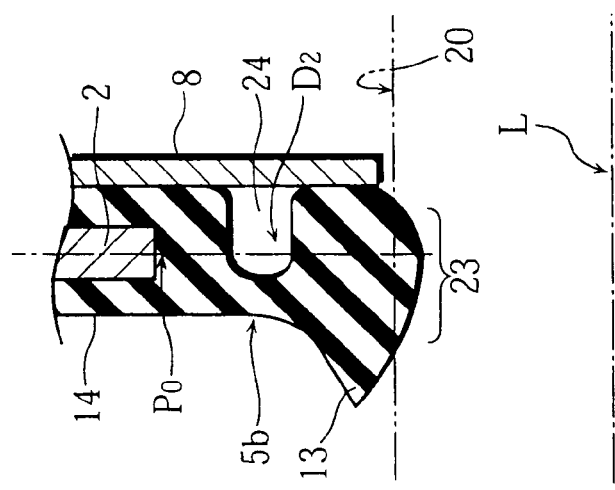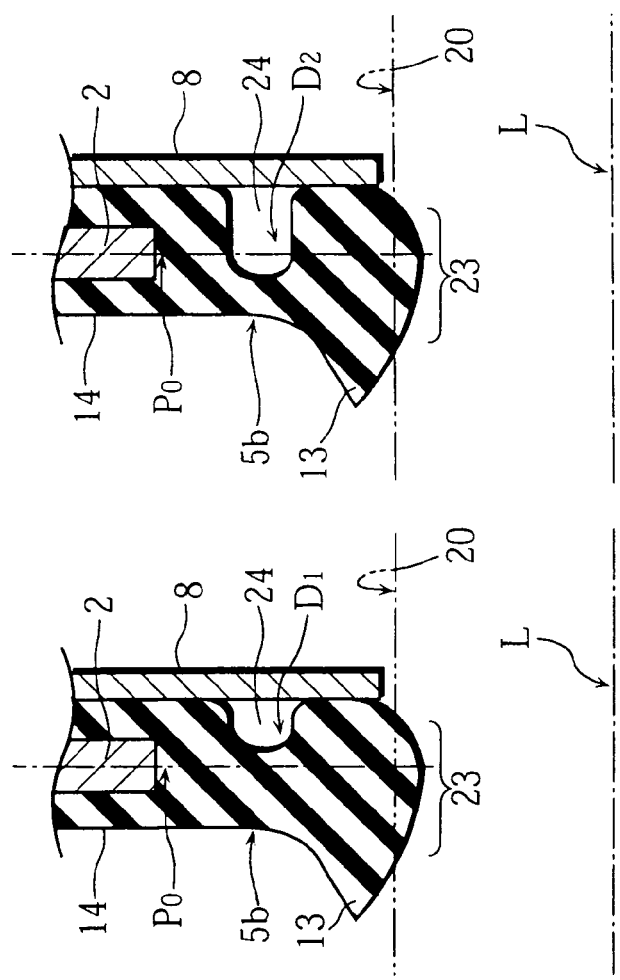

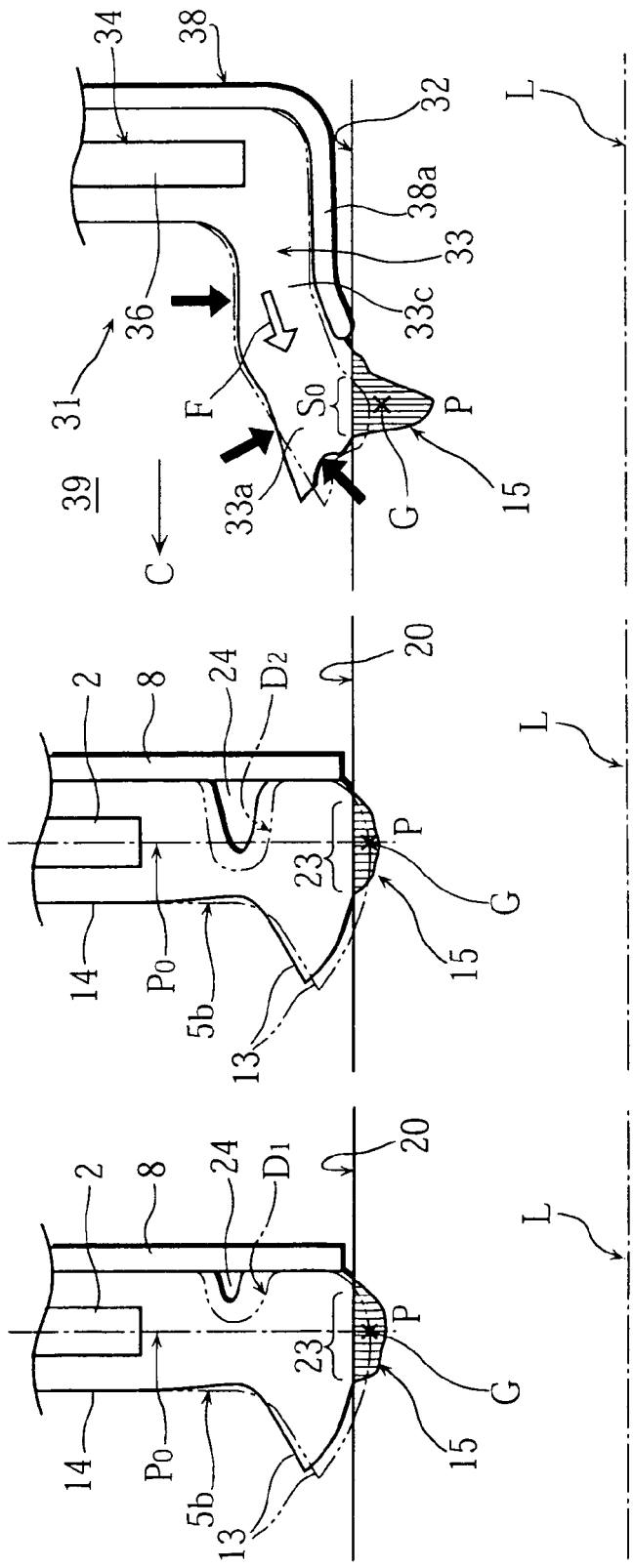

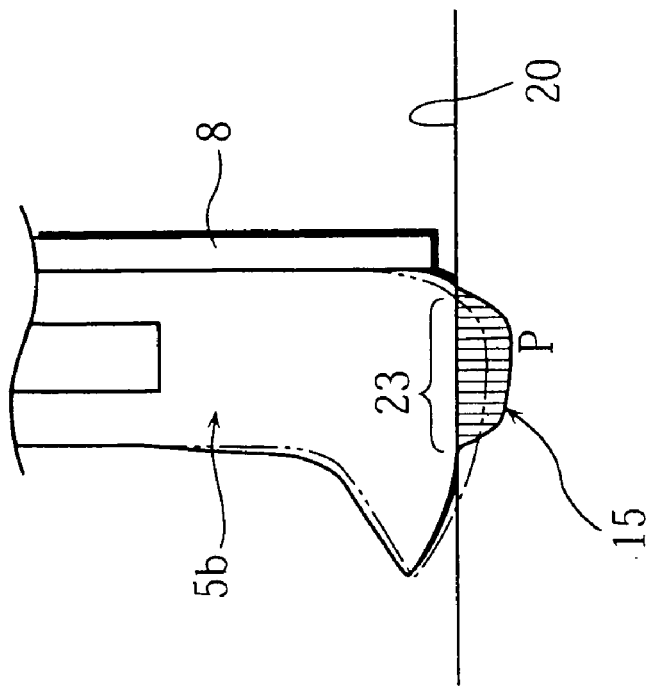
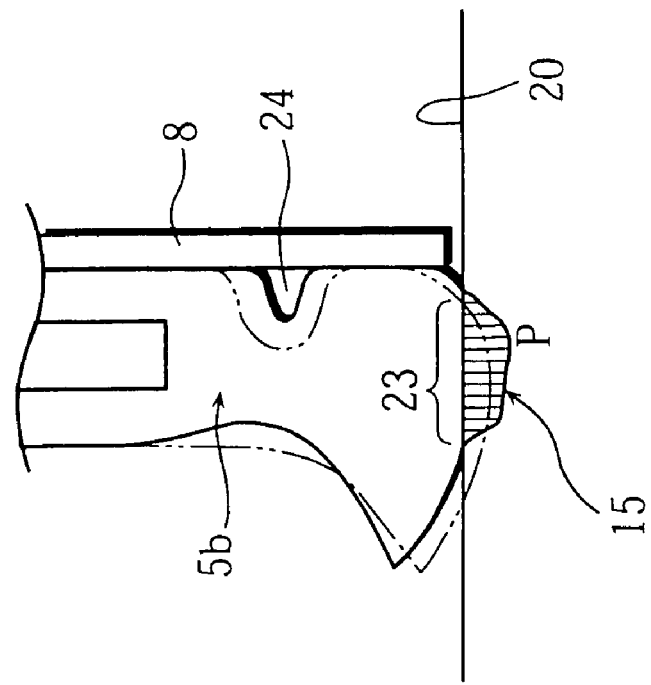
Fig. 11A
Fig. 11B

ROTATION SHAFT SEAL

CROSS REFERENCE TO RELATED APPLICATION

This application is a divisional application of U.S. application Ser. No. 10/849,876, filed May 21, 2004, now U.S. Pat. No. 7,134,670 and claims the right of priority under 35 U.S.C. §119 based on Japanese Patent Application No. 2003-152361 filed on May 29, 2003 and Japanese Patent Application No. 2003-165544 filed on Jun. 10, 2003, which is hereby incorporated by reference herein in its entirety as if fully set forth herein.

BACKGROUND OF THE INVENTION

1. Field of the Invention

This invention relates to a rotation shaft seal, especially, a rotation shaft seal used to seal high-pressure fluid such as gas.

2. Description of the Related Art

Conventionally, a rotation shaft seal 31 as shown in FIG. 16, having a cross-sectional configuration of a rubber lip 33 touching a surface of a rotation shaft 32 extends from an outer case 34 toward a sealed fluid side C as to be approximately L-shaped, is used (refer to Japanese patent provisional publication No. 2003-97723, for example). That is to say, the rotation shaft seal 31 is provided with the outer case 34 having an inner brim 36 on an end portion of the sealed fluid side C, a rubber member 37 is united with the outer case 34 by adhesive or brazing as to surround the inner brim 36 of the outer case 34 and cover a peripheral face of the outer case 34. And, a supporting metal 38 having an L-shaped cross-sectional configuration supports the rubber lip 33 on a low pressure side E and the inner peripheral face side (on a back), and a lip end portion 33a is on a position on an axis direction greatly apart from an axis-orthogonal face $P_0$ including the inner brim 36 of the outer case 34. That is to say, a sliding portion $S_0$ exists on a position on an axis direction greatly apart from the axis-orthogonal face $P_0$ including the inner brim 36, and the rubber lip 33 is in a configuration having a cylindrical extension 33c supported by a cylinder portion 38a of the supporting metal 38.

And, conventionally, in this kind of rotation shaft seals, efforts have been paid in design and production to make the end portion 33a of the lip 33, namely, the sliding portion $S_0$, uniformly sliding on the rotation shaft 32 in the peripheral direction. Therefore, the cylinder portion 38a of the supporting metal 38 is consequently composed of a smooth cylindrical wall portion to have an accurate circular cross section.

In a high-pressure state in which high pressure works on a sealed fluid chamber 39, as shown in FIG. 3B, the cylindrical extension 33c of the rubber lip 33 is compressed and deformed, rubber flows (moves) in an arrow F direction for the supporting metal 38 stopping the rubber, the lip end portion 33a also receives the pressure from the sealed fluid side C, and the rubber looses flexibility because inner stress of the rubber concentrates right on the sliding portion $S_0$. Large contact pressure (pressure) P as shown in FIG. 3B is generated on the sliding portion $S_0$ because the contact pressure is generated by pressing to the rotation shaft seal 32 through the rubber of the area on which the inner stress concentrates. And, sealed fluid (lubricant oil included in the fluid) hardly intrudes on the surface between the rotation shaft 32 and the sliding portion $S_0$ because of the above-mentioned large contact pressure P, and abrasion on the sliding portion $S_0$ of the lip end portion 33a is promoted thereby. Then, the abrasion proceeds as to bite into the sliding portion $S_0$, tightness (sealability) of the seal is rapidly deteriorated, and outer leak of the fluid is generated.

And, in FIGS. 9C and 10C showing the conventional example, the lip end portion 33a (the sliding portion $S_0$) contacts the whole periphery (360°) of the rotation shaft 32 uniformly with large contact pressure P as shown in FIG. 10C when the high pressure works on the sealed fluid chamber 39. The lubricant oil in the sealed fluid hardly intrudes on (being induced to) the surface between the rotation shaft 32 and the sliding portion $S_0$, abrasion on the sliding portion $S_0$ of the lip end portion 33a is promoted, the abrasion proceeds as to bite into the sliding portion $S_0$, tightness (sealability) of the seal is rapidly deteriorated, and outer leak of the fluid is generated. In other words, under a high-pressure circumstance, adding to the strong pressing of the end portion 33a of the rubber lip 33 to the rotation shaft 32, the end portion 33a is uniformly pressed to the whole periphery of the rotation shaft 32, the lubricant oil in the fluid such as a cooling medium can not intrude on the surface of the sliding portion $S_0$ and the rotation shaft 32, frictional resistance is increased, heat is generated, and the sliding portion $S_0$ is rapidly abraded.

It is therefore an object of the present invention to provide a rotation shaft seal, with which the contact pressure of the rubber sealing portion on the contact portion on the rotation shaft is restricted as not to be excessive, having long life for sealing high-pressure gas.

BRIEF DESCRIPTION OF THE DRAWINGS

The present invention will be described with reference to the accompanying drawings in which:

FIGS. 2A and 2B are enlarged explanatory comparison views of configurations of the embodiment of the present invention and a conventional example;

FIGS. 5A and 5B are explanatory comparison views of different embodiments of the present invention;

FIGS. 9A through 9C are enlarged explanatory comparison views of configurations of still another embodiment of the present invention and the conventional example;

FIGS. 10A through 10C are explanatory views to compare configurations and working of the present invention and the conventional example;

FIGS. 11A and 11B are explanatory views of further embodiments of the present invention;

DESCRIPTION OF THE PREFERRED EMBODIMENTS

Preferred embodiments of the present invention will now be described with reference to the accompanying drawings.

Figure 1:
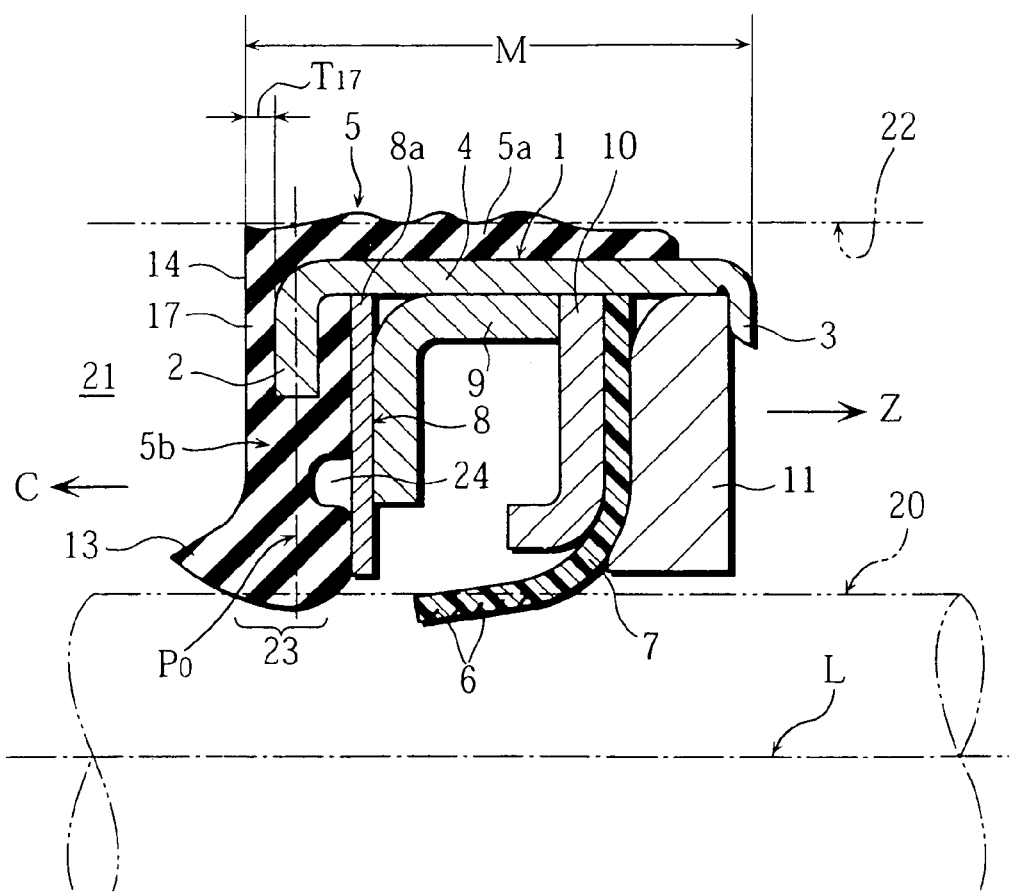
FIG. 1 is a cross-sectional view of a principal portion showing an embodiment of the present invention.

FIG. 1 shows an embodiment of the present invention. This rotation shaft seal is, for example, used for sealing high-pressure cooling media on a sealed fluid chamber 21 side. A half cross section of the rotation shaft seal is shown in FIG. 1, solid lines show a free state, namely, unattached state, and parts of the seal are elastically deformed in an attached state in which the seal is disposed between a rotation shaft 20 and a housing 22.

In FIG. 1, a mark 1 represents an outer case of metal having inner brim portions 2 and 3. A sealing portion 5 of rubber is unitedly fixed to a peripheral face of a cylindrical wall portion 4 of the outer case 1 and both faces of the inner brim portion 2 on a sealed fluid side C (the sealed fluid chamber 21 side) by adhesion, welding, or brazing. A seal element 7 having a spiral groove 6 is disposed on an opposite side (a low pressure side or an atmosphere side) Z to the sealing portion 5. The seal element 7 is preferably made of fluororesin such as PTFE.

A mark 8 represents a supporting metal having I-shaped cross section. The supporting metal 8 of a circular flat plate is fit as a peripheral edge portion 8a contacts the inner peripheral face of the cylindrical wall portion 4 of the outer case 1. The supporting metal 8, a first inner case 9, a second inner case 10, the seal element 7, and an inner member 11 are serially disposed to be fit between the inner brim portions 2 and 3.

The rubber sealing portion 5, unitedly fixed to the outer case 1, is provided with a cylindrical cover portion 5a of which peripheral face is formed undulate (in the free state) to elastically contact the inner peripheral face of the housing 22 to seal, and an axis-orthogonal wall portion 5b extended in an inner radial direction, having an inner brim cover portion having U-shaped cross section to cover the both sides of the inner brim portion 2 on an upper part, and a sliding portion 23 on an inner peripheral end.

That is to say, the rubber sealing portion 5 is provided with the axis-orthogonal wall portion 5b at right angles with an axis L of the rotation shaft 20 (the rotation shaft seal), and the sliding portion 23 having a rounded (R-shaped) portion is composed of the inner peripheral end of the axis-orthogonal wall portion 5b. The supporting metal 8 of circular flat plate supports (presses) the axis-orthogonal wall portion 5b on the low pressure side, namely, the opposite side Z.

And, the axis-orthogonal wall portion 5b of the rubber sealing portion 5 has a circular concave groove 24 on a back face corresponding (pressed) to the supporting metal 8.

As described later, the concave groove 24 absorbs and/or cuts a flow of compressed rubber of the axis-orthogonal wall portion 5b in the inner radial direction (inward in radius).

In other words, the outer case 1 has the inner brim portion 2 on the inner end portion on the sealed fluid side C, and the sliding portion 23 is disposed on an axis-orthogonal face $P_0$ including the inner brim portion 2.

That is to say, the inner brim portion 2 has a (small) thickness, plural axis-orthogonal faces $P_0$ exist on positions in the axis direction for the (small) thickness. The position of the sliding portion 23 in the axis direction is disposed on at least one of the orthogonal faces $P_0$. The position of the sliding portion 23 in the axis direction is defined as a position of a center of gravity G (refer to FIG. 3A) of contact pressure P when sliding on the rotation shaft 20 under the maximum operation pressure.

Although not shown in Figures, it is also preferable to dispose the position of the sliding portion 23 in the axis direction near the axis-orthogonal face $P_0$. The word "near" means deviation within 5 times of the thickness of the inner brim portion 2.

It is also possible to restate that the position of the sliding portion 23 in the axis direction is disposed within a width dimension M of the outer case 1 in the axis direction. The width dimension M in the axis direction is defined as a dimension in which a thickness dimension $T_{17}$ of a rubber covering layer 17 covering the inner brim portion 2 on the sealed fluid side C is included (added to). Specifically, the position of the sliding portion 23 is disposed within a thickness dimension of the axis-orthogonal wall portion 5b of the rubber sealing portion 5 covering the inner brim portion 2. With this construction, positions receiving the pressure from the sealed fluid side C do not exist on an outer side in the radial direction to the center of gravity G of distribution of the contact pressure P when the sliding portion 23 receives the pressure. It is clearly shown when FIG. 3A is compared with the conventional example of FIG. 3B.

Figure 4:
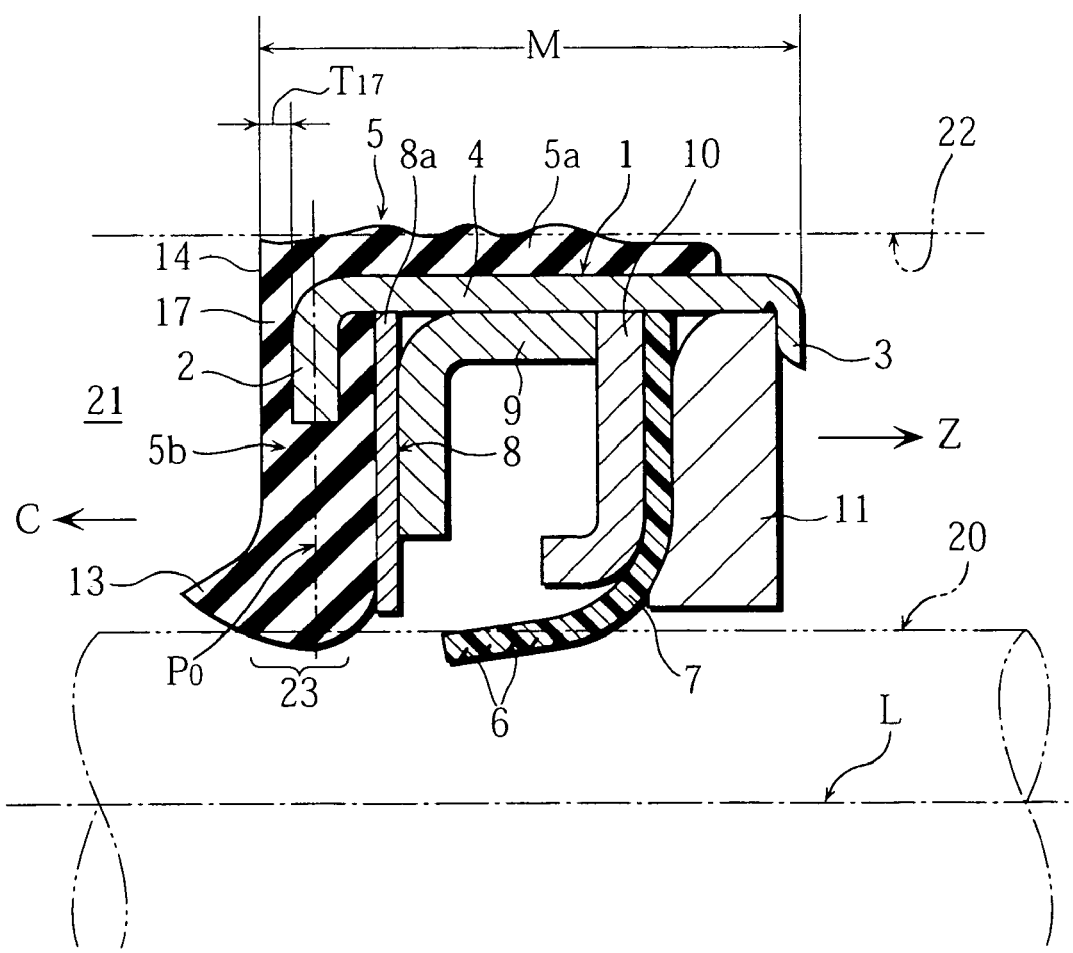
FIG. 4 is a cross-sectional view of a principal portion showing another embodiment.
Figure 6A:
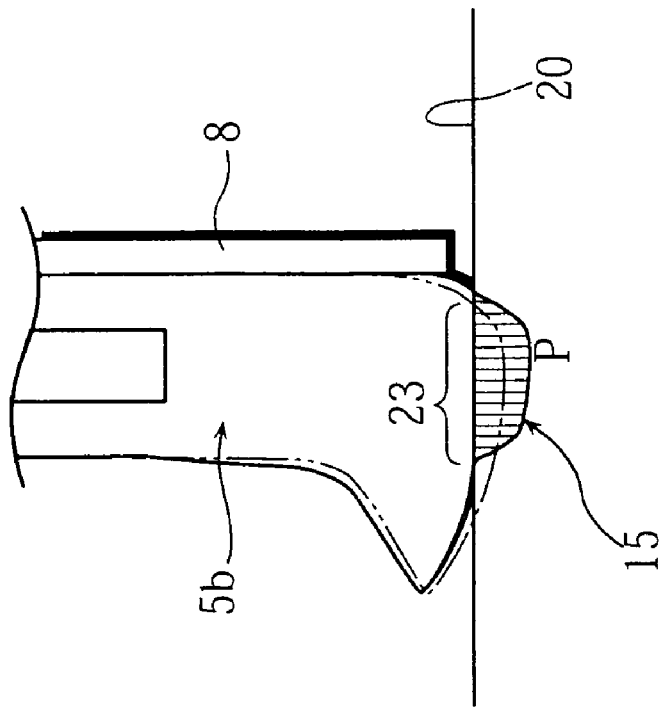
FIGS. 6A and 6B are explanatory comparison views of different embodiments of the present invention.
Figure 6B:
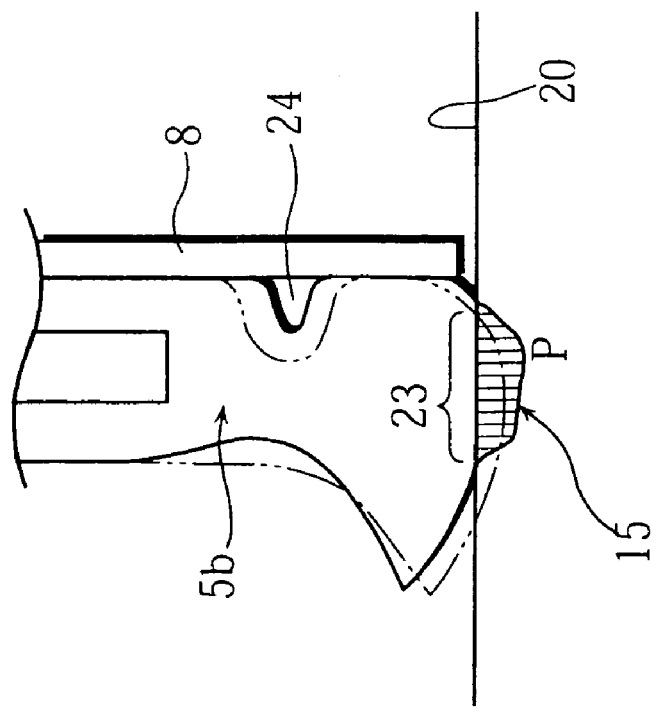

Next, FIG. 4 shows a second embodiment. In FIG. 4, explanation of the same marks, showing similar constructions as in FIG. 1, is omitted. A difference is that the concave groove 24 in FIG. 1 is omitted in FIG. 4 (functional differences will be described later with FIGS. 5A through 6B).

To describe additionally the configuration of the axis-orthogonal wall portion 5b of the rubber sealing portion 5 in FIGS. 1 and 4, the sliding portion 23 is a convex arc in the free state (unattached state), and the convex arc continues to a contact portion with the supporting metal 8. However, a bill-shaped (triangle) protruding portion 13 is formed on the sealed fluid side C.

In other words, although most of the end face 14 of the axis-orthogonal wall portion 5b on the sealed fluid chamber 21 side is flat (of flat face), the end face 14 has the protruding portion 13 formed as to be a bill-shaped (triangle) protrusion.

When the sliding portion 23 is abraded by sliding on the rotation shaft 20, rubber is (newly) sent from the protruding portion 13 by fluid pressure. That is to say, rubber is newly supplied by the protruding portion 13 in abrasion to keep the sliding state of the sliding portion 23 on the rotation shaft 20 to maintain the sealability.

Figure 3B:
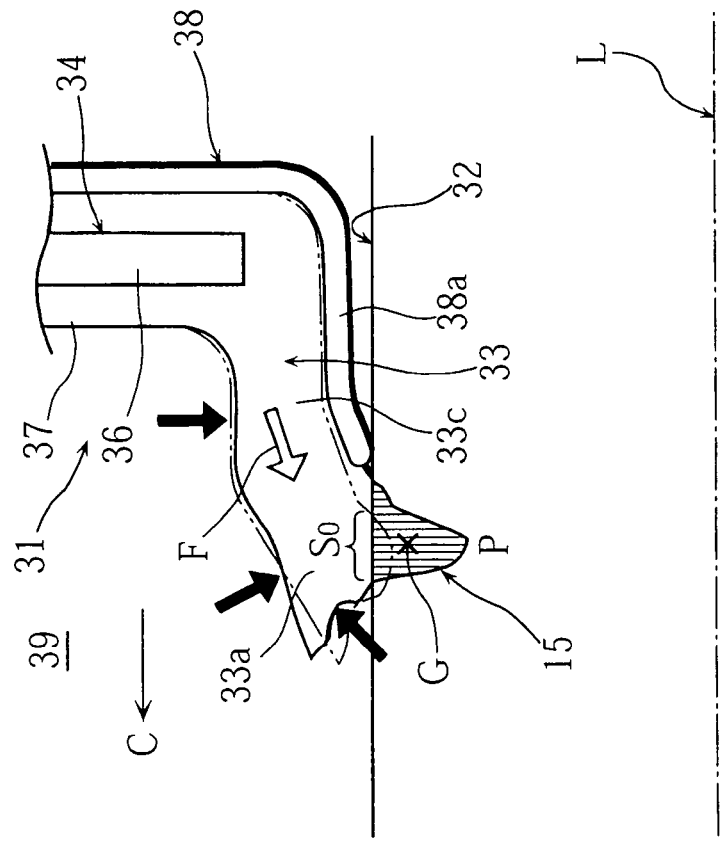
FIGS. 3A and 3B are explanatory views to compare configurations and working of the present invention and the conventional example.
Figure 3A:
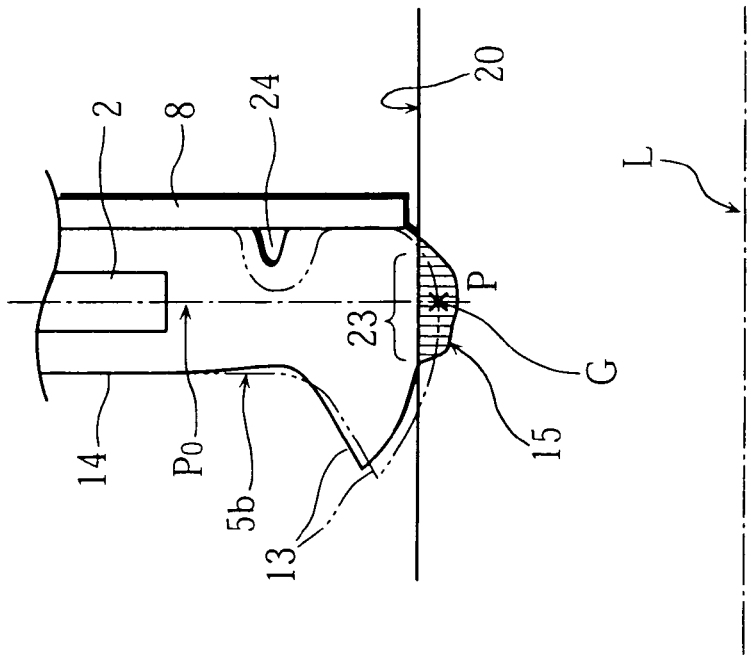
Figure 16:
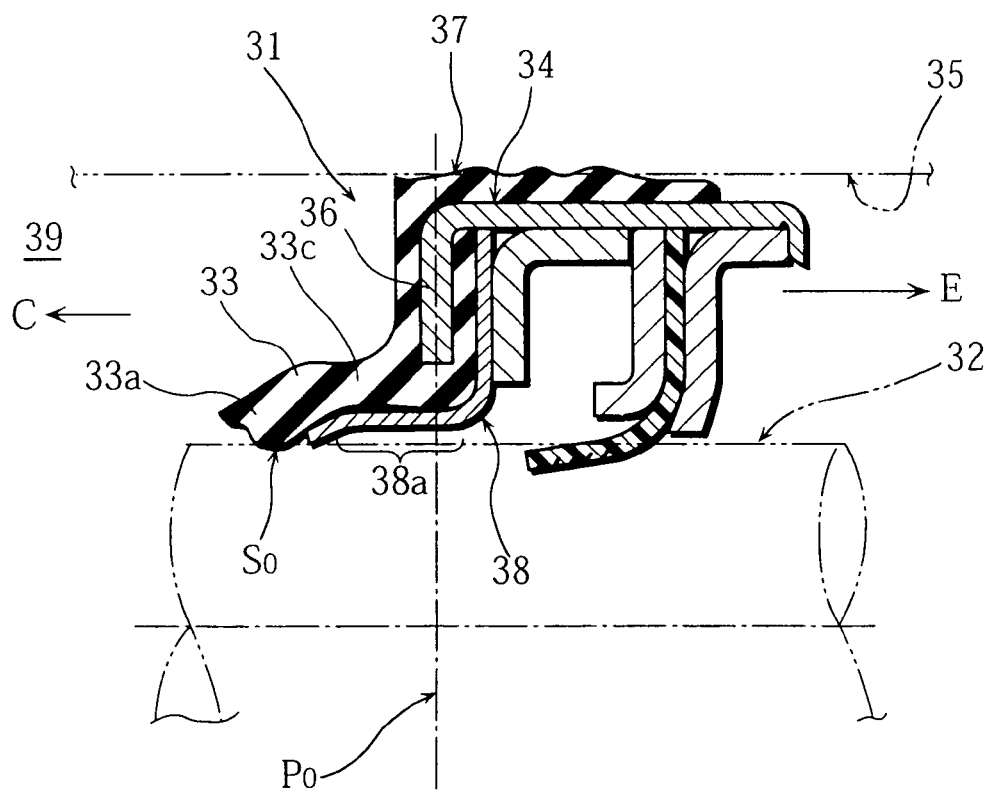
FIG. 16 is a cross-sectional view of a principal portion showing a conventional example.

FIGS. 2A through 3B are showing a principal portion of the embodiment shown in FIG. 1 and the conventional example shown in FIG. 16 side by side. FIGS. 2A and 2B are for comparison in the free state, and FIGS. 3A and 3B are for comparison in pressure-receiving (operational) state in which the fluid pressure works.

As clearly shown by FIGS. 2A through 3B, the present invention completely lacks the cylindrical extension 33c (parallel to the axis L) and the cylinder portion (cylindrical supporting portion), when high-pressure gas such as $CO_2$ works (in pressure-receiving state), the pressure does not directly work (have influence) on the sliding portion 23. Therefore, although high specific pressure is generated in the conventional seal as a diagram of contact pressure distribution shown in FIG. 3B, specific pressure is reduced and pressure distribution is made gentle in the present invention as a diagram 15 of contact pressure distribution shown in FIG. 3A. In FIGS. 3A and 3B, two-dot broken lines show the free state, and solid lines show the pressure-receiving state in which fluid pressure of 6 MPa works.

Conducting an analysis of the contact pressure with FEM, when the fluid pressure is 6 MPa, the maximum contact pressure, reached approximately 11 MPa in the conventional example of FIG. 3B, was about 8 MPa, reduced by about 3 MPa in the present invention of FIG. 3A. And, although not shown in Figures, analysis of inner stress distribution of the rubber by FEM revealed that the absolute value of high stress area, which concentrates around the concave groove 24, is small near the sliding portion 23 and dispersed within a large area. (On the contrary, the high stress area concentrates on the sliding portion $S_0$ in the conventional example of FIG. 3B.)

Working (action) of the seal relating to the present invention is completely different from that of the conventional example (of FIG. 3B) in a point that the contact pressure is obtained by self-sealing effect like ordinary O-rings. That is to say, in the conventional example, the fluid pressure in the inner radial direction directly works on the lip end portion 33a (greatly) extended to the sealed fluid side C and the pressing force by the flow of rubber in the arrow F direction is added to raise the contact pressure P of the sliding portion $S_0$. In the rotation shaft seal relating to the present invention, the fluid pressure works firstly on the end face 14 of the axis-orthogonal wall portion 5b as compression force to the supporting metal 8 on the back side because the working direction is parallel to the axis L, the rubber is compressed, deformed, and moved in the inner radial direction to indirectly push the sliding portion 23 to generate sealing force (sealability). The working (action) corresponds to self-sealing effect of O-rings. Therefore, excessively strong pressing force is prevented from working, the specific pressure is made relatively low as shown with a gentle hill of the diagram 15 of contact-pressure distribution in FIG. 3A, and preferable improvement of durability is made possible thereby.

Further, in FIGS. 1, 2A, and 3A, the concave groove 24 absorbs the rubber moving in the inner radial direction (the concave groove 24 as shown with the two-dot broken line is diminished as shown with the solid line) and/or cuts the movement of the rubber in the inner radial direction to reduce the influence to the increase of the contact pressure on the sliding portion 23.

The working effect of the concave groove is clearly shown by FIGS. 5A through 6B. FIGS. 5A and 6A correspond to the case having the concave groove 24 (corresponding to FIG. 1), FIGS. 5B and 6B correspond to the case without the concave groove 24 (corresponding to FIG. 4), and the contact pressure is analysed by FEM analysis to draw diagrams 15 of the contact pressure distribution. The fluid pressure is 0 in FIGS. 5A and 5B, and 6 MPa in FIGS. 6A and 6B. In FIGS. 5A and 5B, when interference is 0.6 mm, the maximum contact pressure P is more than 3 MPa without the concave groove 24 in FIG. 5B, and approximately 2 MPa with the concave groove 24 in FIG. 5A, reduced by about 1 MPa. And, when the fluid pressure of 6 MPa works (pressure-loading state), the maximum contact pressure P is 9.6 MPa in FIG. 6B, and 8.5 MPa in FIG. 6A, about 1 MPa lower.

Figure 7:
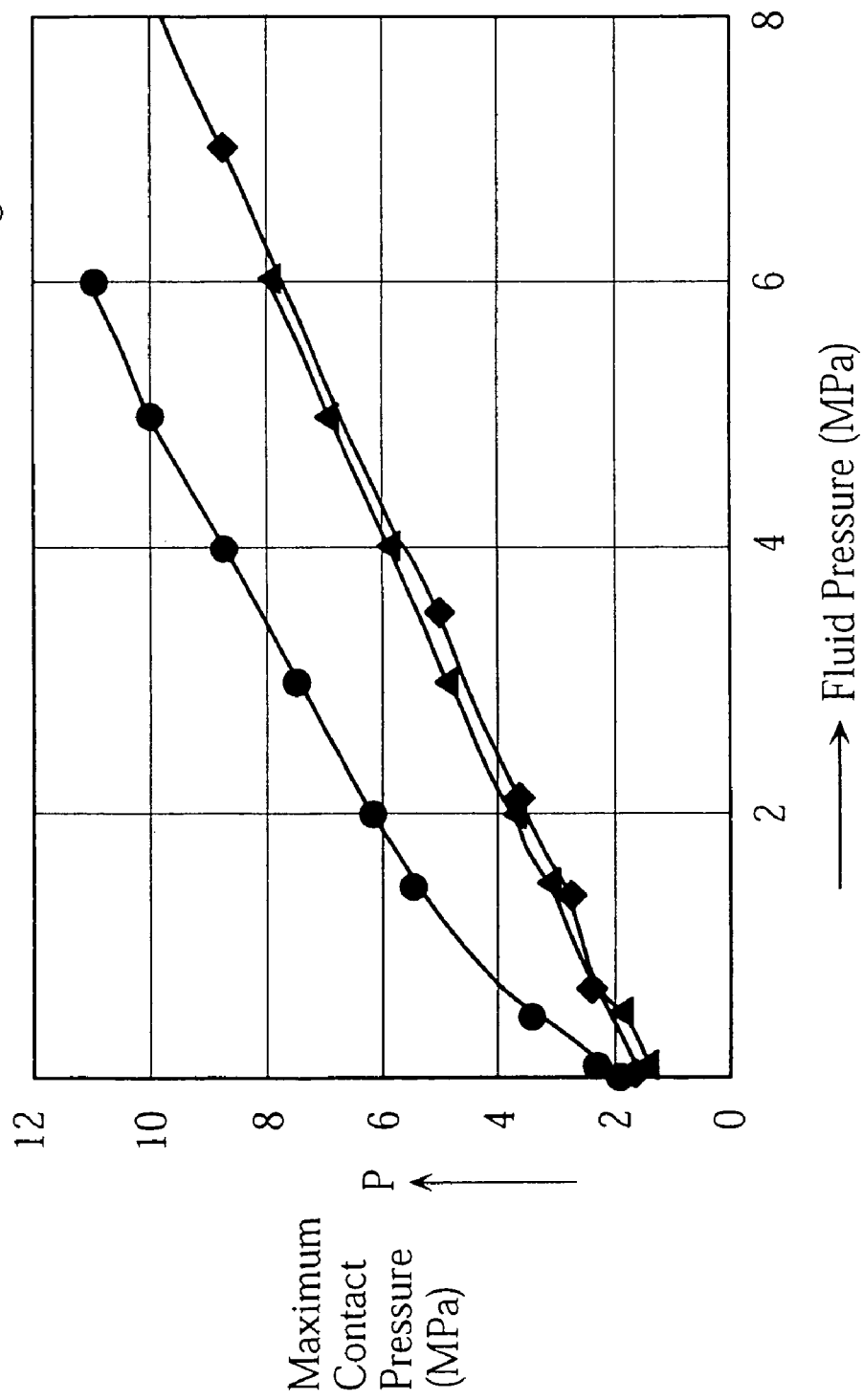
FIG. 7 is a graph showing change in maximum contact pressure to fluid pressure in the present invention and the conventional example.

Next, FIG. 7 is a graph showing "the fluid pressure to the maximum contact pressure" relationship in which the fluid pressure (loaded pressure) is on the axis of abscissae and the maximum contact pressure, namely, the maximum value of the contact pressure on the rotation shaft, is shown on the axis of ordinates. The conventional example is shown with circles and the present invention is shown with triangles, both are analysed by FEM analysis, and actually-measured value of an O-ring is shown with rhombuses.

As shown in FIG. 7, sufficient sealability (tightness) is obtained by the O-ring with the maximum contact pressure of 8 MPa when the fluid pressure is 6 MPa, and the product of the present invention (triangles), showing characteristics very similar to that of the O-ring, has sufficient sealability and durability. On the contrary, the maximum contact pressure becomes excessive of 11 MPa when the fluid pressure is 6 MPa in the conventional example (circles) which may have problems such as early abrasion.

In the present invention, not restricted to the embodiment above, a rubber lip portion may be disposed on the low-pressure side independent from the rubber sealing portion 5, number of the seal elements 7 may be 2 or more, the seal element 7 may be omitted, and the configuration of the supporting metal 8, number and configurations of the inner cases 9 and 10 and the inner member 11 may be changed.

Figure 8A:
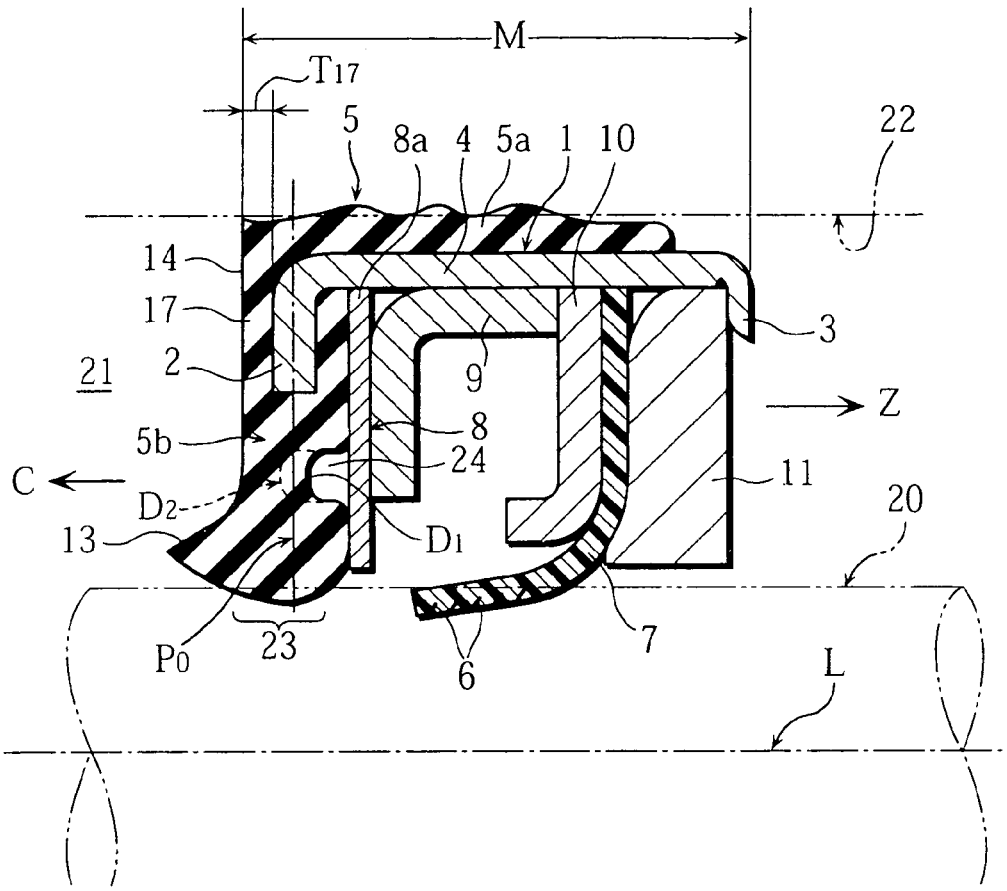
FIG. 8A is a cross-sectional side view of a principal portion showing still another embodiment of the present invention.
Figure 8B:
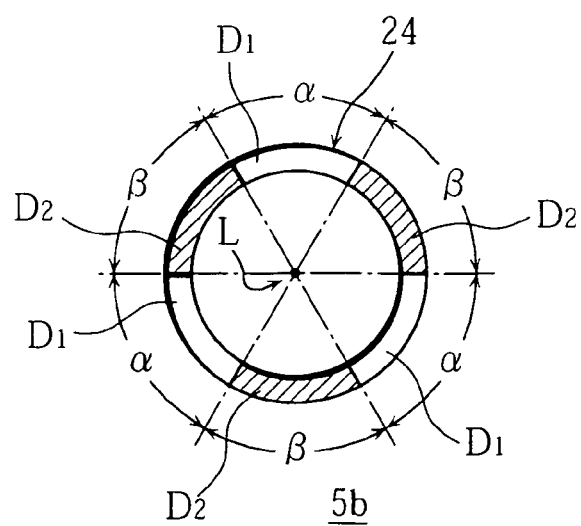
FIG. 8B is a rear view of a principal portion showing still another embodiment of the present invention.

FIGS. 8A and 8B show another embodiment of the present invention. FIG. 8A shows a longitudinal cross section of a principal portion, and FIG. 8B is a simplified explanatory view of construction in which the principal portion is observed in the axis L direction. This rotation shaft seal is, for example, to seal fluid such as high pressure cooling medium on the sealed fluid chamber 21 side. A half cross section of the rotation shaft seal is shown in FIG. 8A, solid lines show a free state, namely, unattached state, and the rotation shaft 20 and the housing (casing) 22 are shown with two-dot broken lines. Parts of the seal are elastically deformed in an attached state in which the seal is disposed between the rotation shaft 20 and the housing 22.

In FIGS. 8A and 8B, although description of the members of the same marks as in FIG. 1, similarly constructed as in FIG. 1, is omitted, the axis-orthogonal wall portion 5b of the rubber sealing portion 5 has a ring concave groove 24 on a back face corresponding (pressed) to the supporting metal 8 in FIG. 8A. FIG. 8B is a rear view showing an example of the ring concave groove 24 (observed in the axis L direction).

As described later, the ring concave groove 24 absorbs and/or cuts a flow of compressed rubber of the axis-orthogonal wall portion 5b in the inner radial direction (inward in radius).

In other words, the outer case 1 has the inner brim portion 2 on the inner end portion on the sealed fluid side C, and the sliding portion 23 is disposed on an axis-orthogonal face $P_0$ including the inner brim portion 2.

That is to say, the inner brim portion 2 has a (small) thickness, plural axis-orthogonal faces $P_0$ exist on positions in the axis direction for the (small) thickness. The position of the sliding portion 23 in the axis direction is disposed on at least one of the orthogonal faces $P_0$. The position of the sliding portion 23 in the axis direction is defined as a position of a center of gravity G (refer to FIG. 10A) of contact pressure P when sliding on the rotation shaft 20 under the maximum operation pressure.

Although not shown in Figures, it is also preferable to dispose the position of the sliding portion 23 in the axis direction near the axis-orthogonal face $P_0$. The word "near" means deviation within 5 times of the thickness of the inner brim portion 2.

It is also possible to restate that the position of the sliding portion 23 in the axis direction is disposed within a width dimension M of the outer case 1 in the axis direction. The width dimension M in the axis direction is defined as a dimension in which a thickness dimension $T_{17}$ of a rubber covering layer 17 covering the inner brim portion 2 on the sealed fluid side C is included (added to). Specifically, the position of the sliding portion 23 is disposed within a thickness dimension of the axis-orthogonal wall portion 5b of the rubber sealing portion 5 covering the inner brim portion 2. With this construction, positions receiving the pressure from the sealed fluid side C do not exist on an outer side in the radial direction to the center of gravity G of distribution of the contact pressure P when the sliding portion 23 receives the pressure. It is clearly shown when FIG. 10A is compared with the conventional example of FIG. 10C.

Next, a remarkable characteristic of the present invention is described. In FIGS. 8A through 10B, the ring concave groove 24 is set to have depth dimensions changing in peripheral direction to make the contact pressure P of the sliding portion 23 on the rotation shaft 20 uneven (ununiform) in the peripheral direction. In FIG. 8A, a solid line shows a portion $D_1$ of shallow (small) depth dimension, and a broken line shows a portion $D_2$ of deep (large) depth dimension. In the example of FIG. 8B, portions $D_1$ of shallow depth dimension of which central angle α is about 60° and portions $D_2$ of deep depth dimension of which central angle β is about 60° are disposed in turn. It is possible to set α>β, or oppositely α<β. The contact pressure P is small with the portions $D_2$ of deep depth dimension as in FIG. 10B, the lubricant oil in the fluid is easily induced and spread over the entire periphery of the sliding portion 23 to restrict the abrasion of rubber.

To describe additionally the configuration of the axis-orthogonal wall portion 5b of the rubber sealing portion 5 in FIGS. 8A through 9B, the sliding portion 23 is a convex arc in the free state (unattached state), and the convex arc continues to a contact portion with the supporting metal 8. However, a bill-shaped (triangle) protruding portion 13 is formed on the sealed fluid side C.

In other words, although most of the end face 14 of the axis-orthogonal wall portion 5b on the sealed fluid chamber 21 side is flat (of flat face), the end face 14 has the protruding portion 13 formed as to be a bill-shaped (triangle) protrusion. When the sliding portion 23 is abraded by sliding on the rotation shaft 20, rubber is (newly) sent from the protruding portion 13 by fluid pressure. That is to say, rubber is newly supplied by the protruding portion 13 in abrasion to keep the sliding state of the sliding portion 23 on the rotation shaft 20 to maintain the sealability.

FIGS. 9A through 10C are showing a principal portion of the embodiment shown in FIGS. 8A and 8B and the conventional example side by side. FIGS. 9A through 9C are for comparison in the free state, and FIGS. 10A through 10C are for comparison in pressure-receiving (operational) state in which the fluid pressure works. And, FIGS. 9A and 10A show a cross section of the portion $D_1$ of shallow depth dimension, FIGS. 9B and 10B show a cross section of the portion $D_2$ of deep depth dimension, and FIGS. 9C and 10C show the conventional example.

As clearly shown by FIGS. 9A through 10C, the embodiment of the present invention shown in FIG. 8A completely lacks the cylindrical extension 33c (parallel to the axis L) and the cylinder portion (cylindrical supporting portion) 38a, when high-pressure gas such as $CO_2$ works (in pressure-receiving state), the pressure does not directly work (have influence) on the sliding portion 23. Therefore, although high specific pressure is generated in the conventional seal as a diagram of contact pressure distribution shown in FIG. 10C, specific pressure is reduced and pressure distribution is made gentle in the embodiment of the present invention as diagrams 15 of contact pressure distribution shown in FIGS. 10A and 10B. In FIGS. 10A through 10C, two-dot broken lines show the free state, and solid lines show the pressure-receiving state in which fluid pressure of 6 MPa works.

Conducting an analysis of the contact pressure with FEM, when the fluid pressure is 6 MPa, the maximum contact pressure, reached approximately 11 MPa in the conventional example of FIG. 10C, was about 8 MPa, reduced by about 3 MPa in the present invention of FIG. 10A. And, although not shown in Figures, analysis of inner stress distribution of the rubber by FEM revealed that the absolute value of high stress area, which concentrates around the concave groove 24, is small near the sliding portion 23 and dispersed within a large area. (On the contrary, the high stress area concentrates on the sliding portion $S_0$ in the conventional example of FIG. 10C.)

Working (action) of the rotation shaft seal relating to the embodiment of the present invention shown in FIGS. 8A, 9A, 9B, 10A, and 10B (and later-described other embodiments shown in FIGS. 12A through 14B) is completely different from that of the conventional example (of FIG. 10C) in a point that the contact pressure is obtained by self-sealing effect like ordinary O-rings. That is to say, in the conventional example, the fluid pressure in the inner radial direction directly works on the lip end portion 33a (greatly) extended to the sealed fluid side C and the pressing force by the flow of rubber in the arrow F direction is added to raise the contact pressure P of the sliding portion $S_0$. In the embodiment of the seal relating to the present invention, the fluid pressure works firstly on the end face 14 of the axis-orthogonal wall portion 5b as compression force to the axis-orthogonal supporting metal 8 on the back side because the working direction is parallel to the axis L, the rubber is compressed, deformed, and moved in the inner radial direction to indirectly push the sliding portion 23 to generate sealing force (sealability). The working (action) corresponds to self-sealing effect of O-rings. Therefore, excessively strong pressing force is prevented from working, the specific pressure is made relatively low as shown with gentle hills of the diagrams 15 of contact-pressure distribution in FIGS. 10A and 10B, and preferable improvement of durability is made possible thereby.

Further, the concave groove 24 absorbs the rubber moving in the inner radial direction (the concave groove 24 as shown with the two-dot broken line is diminished as shown with the solid line) and/or cuts the movement of the rubber in the inner radial direction to reduce the influence to the increase of the contact pressure on the sliding portion 23.

The working effect of the concave groove is clearly shown by FIGS. 11A and 11B. FIG. 11A corresponds to the case having the concave groove 24 (corresponding to FIG. 8A), FIG. 11B corresponds to the case without the concave groove 24, and the contact pressure is analysed by FEM analysis to draw diagrams 15 of the contact pressure distribution. The fluid pressure is 6 MPa in FIGS. 11A and 11B. When interference is 0.6 mm and the fluid pressure is 0, the maximum contact pressure P is more than 3 MPa without the concave groove 24, and approximately 2 MPa with the concave groove 24, reduced by about 1 MPa. And, when the fluid pressure of 6 MPa works (pressure-loading state), the maximum contact pressure P is 9.6 MPa in FIG. 11B, and 8.5 MPa in FIG. 11A, about 1 MPa lower.

Figure 12A:
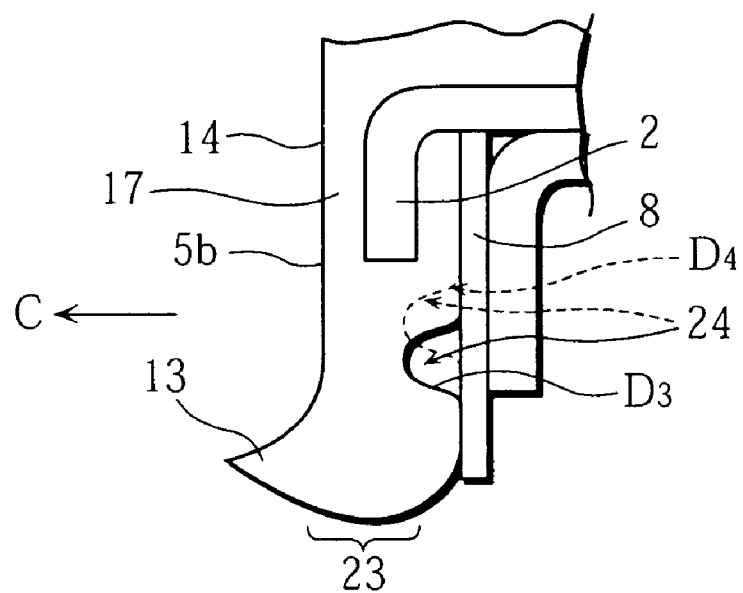
FIG. 12A is a cross-sectional side view of a principal portion showing still further embodiment of the present invention.
Figure 12B:
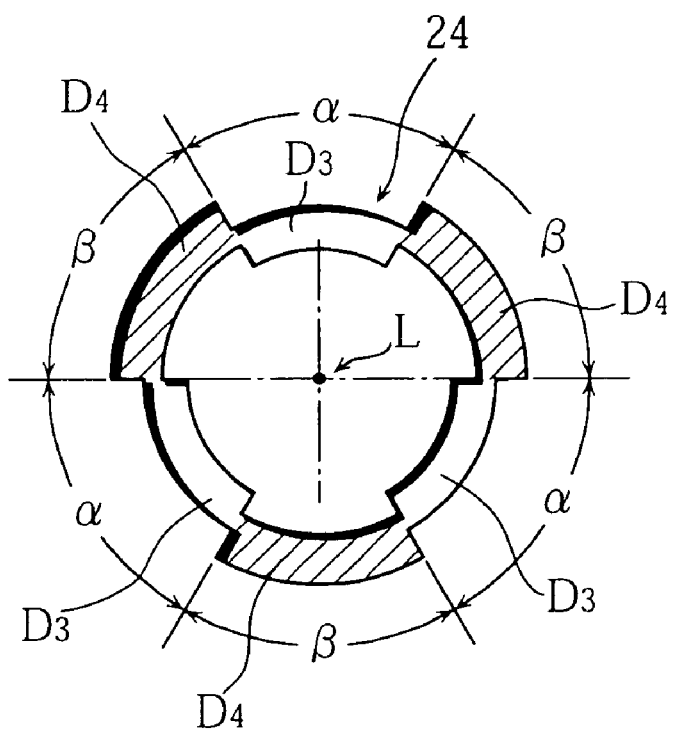
FIG. 12B is a rear view of a principal portion showing still further embodiment of the present invention.

Next, FIGS. 12A and 12B show another embodiment. FIG. 12A is a longitudinal cross section of a principal portion, FIG. 12B is a (rear) view of the ring concave portion 24 observed in a direction parallel to the axis L, and positions in the radial direction of the concave groove 24 are changed in turn for predetermined central angles α and β.

That is to say, although the members of the same marks are similarly constructed to FIG. 8A, following points are different. A solid line shows an arc portion $D_3$ on which the position of the concave groove 24 in the radial direction is near the axis L, a broken line shows an arc portion $D_4$ on which the position of the concave groove 24 in the radial direction is far from the axis L, and the arc portions $D_3$ and $D_4$ are disposed in turn with central angles α and β of about 60° for example. In other words, the arc portion $D_3$ of the central angle α has a small radius from the axis, and the arc portion $D_4$ of the central angle β, shown with hatching in FIG. 12B, has a large radius from the axis. The both arc portions $D_3$ and $D_4$ are connected through staged portions to form the concave groove 24 ring shaped as a whole. It is possible to set the number of each of the arc portions $D_3$ and $D_4$, 4 or more, α>β, or α<β. The contact pressure P of the sliding portion 23 is low with the arc portion $D_3$ of small radius dimension from the axis, the lubricant oil in the fluid is easily induced and spread over the entire periphery of the sliding portion 23 to restrict the abrasion of rubber.

As described above, in the embodiment of FIGS. 12A and 12B, the ring concave groove 24 changes its positions in the radial direction along the periphery to make the contact pressure P of the sliding portion 23 on the surface of the rotation shaft 20 uneven (ununiform) in the peripheral direction. The lubricant oil is induced from positions of low contact pressure (positions corresponding to the arc portions $D_3$) and spread over the entire periphery of the sliding portion 23 with the rotation of the rotation shaft 20, and frictional heat is restricted and early abrasion is prevented thereby to improve the durability.

Figure 13A:
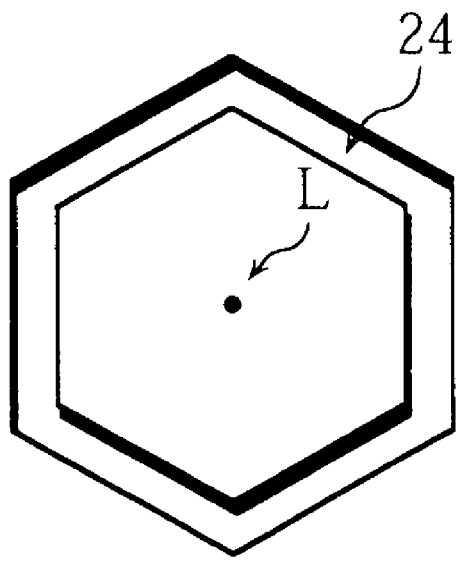
FIGS. 13A and 13B are rear views of principal portions of further embodiments of the present invention.
Figure 13B:
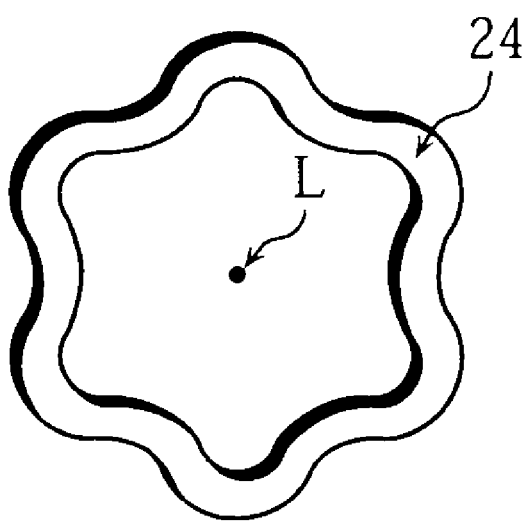

Next, each of FIGS. 13A and 13B, corresponding to above-mentioned FIGS. 8B and 12B, shows an embodiment respectively. In FIG. 13A, the ring concave groove 24 is formed into a polygonal configuration such as a hexagon (number of corners may be freely increased and reduced) when observed in a direction parallel to the axis L to change positions in radial direction of the concave groove 24, namely, distances from the axis to points on the concave groove 24 in the peripheral direction. And, in FIG. 13B, the ring concave groove 24 has a concavo-convex configuration such as a flower and rounded gear when observed in a direction parallel to the axis L based on the basic circle to smoothly change positions in radial direction of the concave groove 24, namely, distances from the axis to points on the concave groove 24 in the peripheral direction.

As described above, in the embodiment of FIGS. 13A and 13B, the ring concave groove 24 has the configuration which changes its positions in the radial direction along the periphery to make the contact pressure P of the sliding portion 23 on the surface of the rotation shaft 20 uneven (ununiform) in the peripheral direction. The lubricant oil is induced from positions of low contact pressure (positions middle of sides in FIG. 13A or positions near concave portions in FIG. 13B) and spread over the entire periphery of the sliding portion (with the rotation of the rotation shaft), and early abrasion is prevented thereby to improve the durability. Number of sides of the polygon in FIG. 13A and number of concaves and convexes may be freely increased and decreased.

Figure 14A:
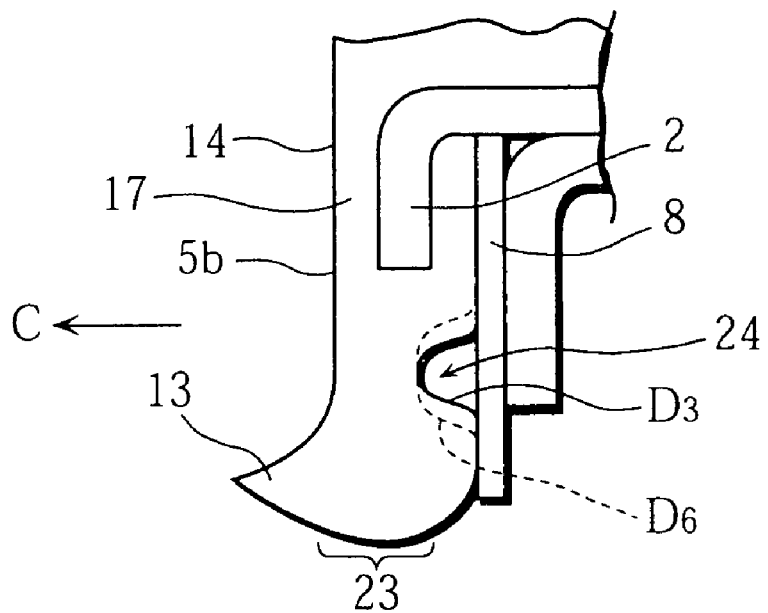
FIG. 14A is a cross-sectional side view of a principal portion showing still further embodiment of the present invention.
Figure 14B:
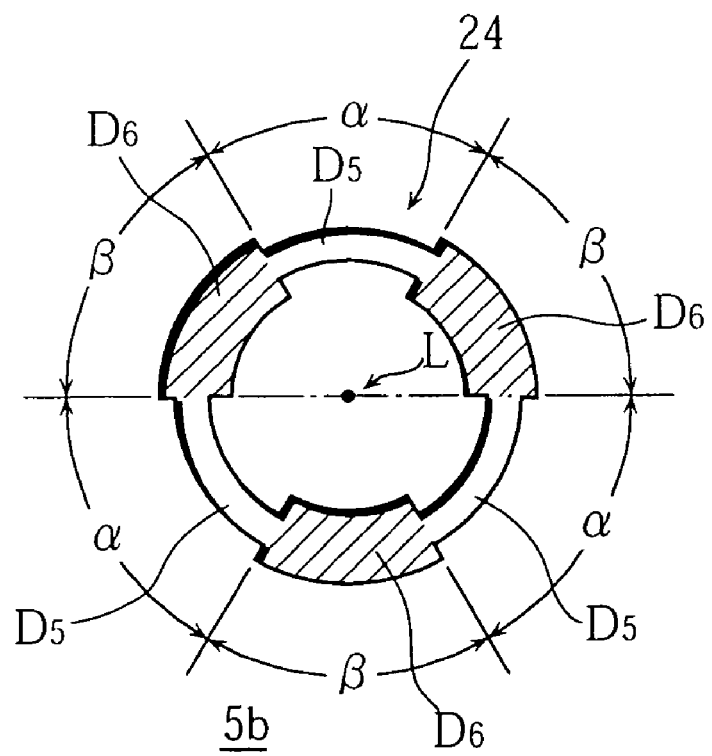
FIG. 14B is a rear view of a principal portion showing still further embodiment of the present invention.

Next, FIGS. 14A and 14B, corresponding to the above-mentioned FIGS. 8A and 8B, show further embodiment. That is to say, although the members of the same marks in FIG. 14A are similarly constructed to FIG. 8A, following points are different. A solid line shows an arc portion $D_5$ having a small width dimension on the concave groove 24, a broken line shows an arc portion $D_6$ having a large width dimension, and the arc portions $D_5$ and $D_6$ are disposed in turn with central angles α and β of about 60° for example. It is possible to set the number of each of the arc portions $D_5$ and $D_6$ 4 or more, α>β, or α<β. In FIG. 14B, the arc portions $D_6$ of large width dimension are distinguished by hatching.

As described above, in the embodiment of FIGS. 14A and 14B, the width dimension of the ring concave groove 24 increases and decreases (along the periphery) to make the contact pressure P of the sliding portion 23 on the surface of the rotation shaft 20 uneven (ununiform) in the peripheral direction. The lubricant oil is induced from positions of low contact pressure (positions of the arc portions $D_6$ of large width dimension) and spread over the entire periphery of the sliding portion (with the rotation of the rotation shaft), and early abrasion is prevented thereby to improve the durability.

It is also preferable to make a construction in which the above mentioned embodiments (in FIGS. 8A, 8B, and 12A through 14B) are combined. For example, it is preferable to change the depth and the position in radial direction of the concave groove 24 together along the periphery, change the depth and the width dimension of the concave groove 24 along the periphery, or change the width dimension and the position in radial direction of the concave groove 24 together along the periphery (not shown in Figures).

Next, further embodiments shown in FIGS. 15A through 15D add improvements to the conventional example in FIGS. 9C and 10C to make the contact pressure P ununiform in the peripheral direction as described above in FIGS. 8A, 8B, and 12A through 14B.

Figure 15A:
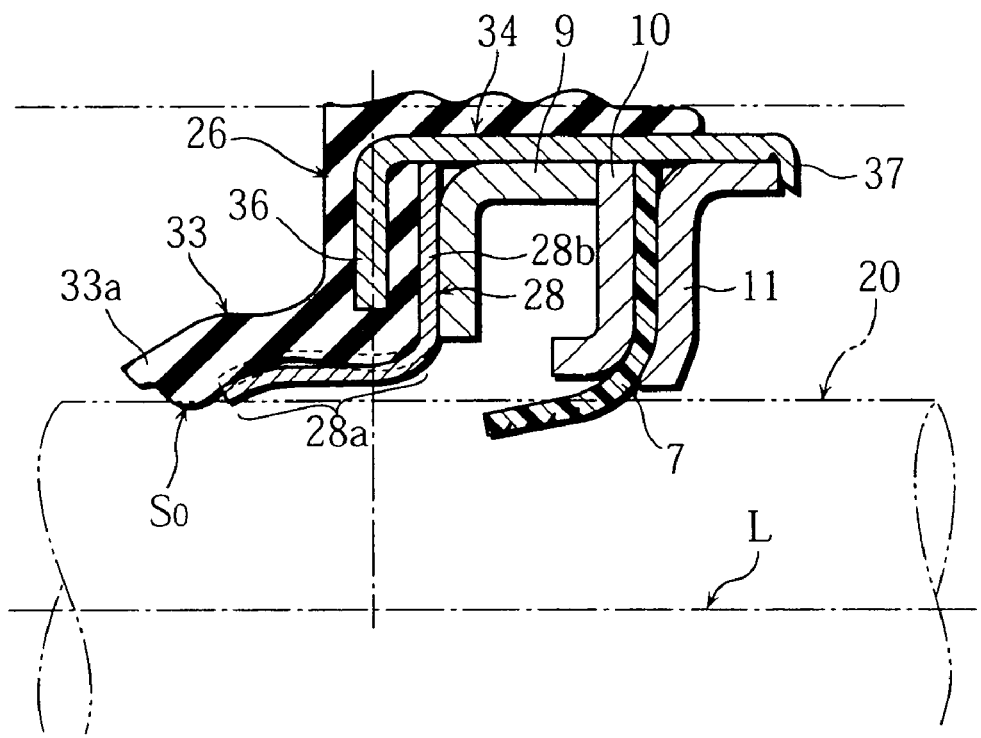
FIG. 15A is a cross-sectional side view of a principal portion showing further embodiment of the present invention.
Figure 15B:
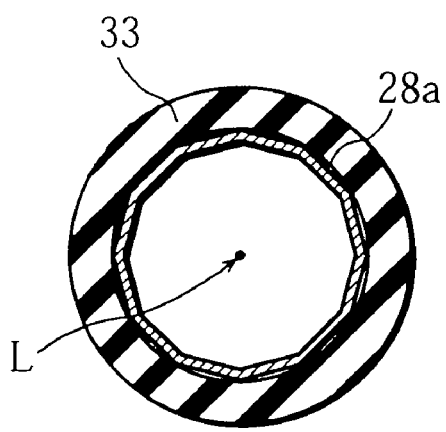
FIGS. 15B through 15D are cross-sectional views of principal portions showing further embodiments of the present invention.

In the embodiment shown in a longitudinal cross section of a principal portion of FIG. 15A and a cross section of a principal portion of FIG. 15B, basically similar to FIGS. 9C and 10C, a rubber sealing portion 26, having a sliding portion $S_0$ which contacts the surface of the rotation shaft 20 on an end portion 33a of a lip 33, is provided, an outer case 34 has a pair of inner brims 36 and 37, and the rubber sealing portion 26 is unitedly fixed to the outer case 34 by brazing or adhesion.

Figure 15C:
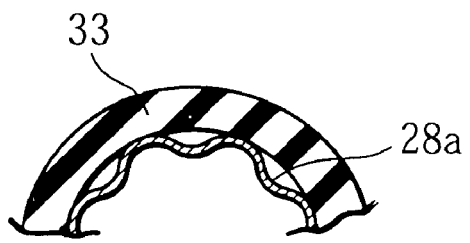
Figure 15D:
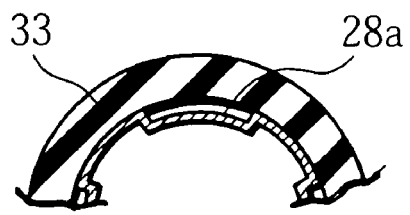

A back-supporting metal 28 which supports the rubber sealing portion 26 from a back face side is L-shaped in cross section, and having a cylindrical supporting portion 28a, supporting the lip 33 of the rubber sealing portion 26 from an inner peripheral face side, and an orthogonal wall portion 28b at right angles with an axis L. And, cross sectional configuration of the cylindrical supporting portion 28a is made ununiform to a (basic imaginary) circle in radial direction. That is to say, the cross-sectional configuration of the cylindrical supporting portion 28a is formed polygonal as in FIG. 15B to make contact pressure P (on the surface of the rotation shaft 20) of the sliding portion $S_0$ of the lip end portion 33a ununiform along the periphery. And, FIGS. 15C and 15D show another embodiment corresponding to FIG. 15B. The cylindrical supporting portion 28a is formed as a ring with concavo-convex undulation in FIG. 15C, and formed as a ring with concavo-convex stages in FIG. 15D. In any case, the seal is constructed as to make the contact pressure P of the lip end portion 33a on the surface of the rotation shaft 20 uneven (ununiform) along the periphery.

The contact pressure P of the sliding portion $S_0$ is made small on corners in FIG. 15B, on convex portions in FIG. 15C, and on convex arc portions in FIG. 15D to facilitate inducement (intrusion) of the lubricant oil into the sliding portion $S_0$ as to spread the lubricant oil over the whole periphery of the sliding portion $S_0$ along the rotation of the rotation shaft 20 to prevent early abrasion and improve durability. Description of the marks 7, 9, 10, 11, etc. in FIGS. 15A through 15D is omitted because they are similar to that in FIGS. 8A and 8B.

Although it is possible to form the ring concave groove 24 of the above-described embodiments into a circle having uniform depth and uniform width dimension, or form the back-supporting metal into a circle, and form the sliding portion 23 or $S_0$ itself into a circular shape with concavo-convex undulation (not a circle) to make the contact pressure P on the surface of the rotation shaft 20 uneven (ununiform) in the peripheral direction when the rotation shaft is inserted, problems in air tightness are generated in low pressure state of the sealed fluid or unpressurized state.

In the present invention, not restricted to the embodiments above, for example, the rubber lip portion may be disposed on the low pressure side independent from the rubber sealing portion 5, number of the seal elements 7 may be 2 or more, the seal element 7 may be omitted, and the configuration of the supporting metal 8, number and configurations of the inner cases 9 and 10 and the inner member 11 may be changed.

With the construction of the above-described embodiments in FIGS. 8A, 8B (9A, 9B, 10A, 10B), and 12A through 14B, the contact pressure P is prevented from being excessive and kept at an appropriate value, lubrication state with the rotation shaft 20 is maintained well, abrasion is restricted, and good sealability (tightness) is demonstrated for a long time because the pressing force in the inner radial direction by the fluid pressure does not work on the sliding portion 23. Especially, the seal is appropriate for sealing high-pressure gas. Further, the dimension of the rotation shaft seal in the axis direction can be reduced to be compact.

According to the rotation shaft seal of the present invention, the contact pressure P is prevented from being excessive and kept at an appropriate value, lubrication state with the rotation shaft 20 is maintained well, abrasion is restricted, and good sealability (tightness) is demonstrated for a long time because the pressing force in the inner radial direction by the fluid pressure does not work on the sliding portion 23. Especially, the seal is appropriate for sealing high-pressure gas. Further, the dimension of the rotation shaft seal in the axis direction can be reduced to be compact.

The contact pressure P of the sliding portion 23 on the rotation shaft 20 is certainly restricted as not to be excessive because the supporting metal 8 receives the fluid pressure in parallel to the axis L and moves the rubber in the radial direction. Further, the dimension of the rotation shaft seal in the axis direction can be certainly reduced to be compact.

The contact pressure P of the sliding portion 23 on the rotation shaft 20 is easily kept at appropriate value to maintain excellent tightness (sealability) for a long time (good durability).

Especially, the abrasion biting into the sliding portion 23 (generated in the conventional example) is not generated, abrasion uniformly proceeds, and the tightness (sealability) is maintained for a long time because the high stress area concentrates near the concave groove 24 (not near the sliding portion 23).

While a certain interference has to be set for corresponding to eccentricity of the rotation shaft and the housing 22 from the axis L of the rotation shaft 20, the contact pressure P can be reduced with the interference for the concave groove 24. And, trackability to the eccentricity is good for flexibility by the concave groove 24.

The contact pressure P is made ununiform in the peripheral direction to make the lubricant oil intrude between the sliding portion 23 and the rotation shaft 20 from the portions of small contact pressure P, spread the lubricant oil over the entire periphery of the sliding portion 23 along the rotation to prevent frictional heat generation and early abrasion, and long life of the seal is obtained. And, there is an advantage that defection of air tightness is not generated when the sliding portion 23 itself is formed concavo-convex.

Further, in the embodiment of FIGS. 15A through 15D, even if the seal is not appropriate for high pressure in claim 2, the contact pressure P is made ununiform in the peripheral direction to make the lubricant oil intrude between the sliding portion 23 and the rotation shaft 20 from the portions of small contact pressure P, spread the lubricant oil over the entire periphery of the sliding portion 23 along the rotation to prevent frictional heat generation and early abrasion, and long life of the seal is obtained under considerably high pressure. And, there is an advantage that defection of air tightness is not generated when the sliding portion 23 itself is formed concavo-convex. And, the product is easily converted because it is necessary only to replace the conventional back-supporting metal 38 with the back-supporting metal 28 of the present invention.

While preferred embodiments of the present invention have been described in this specification, it is to be understood that the invention is illustrative and not restrictive, because various changes are possible within the spirit and indispensable features.

What is claimed is:

1. A rotation shaft seal provided with a rubber sealing portion provided with an axis-orthogonal wall portion having a sliding portion on an inner peripheral edge and an axis-orthogonal supporting metal, supporting the axis-orthogonal wall portion from a low pressure side, comprising a construction in which a ring concave groove is formed on a back face side of the axis-orthogonal wall portion where the axis-orthogonal wall portion of the rubber sealing portion is pressed to the supporting metal to absorb flow in an inner radial direction of rubber compressed by receiving pressure, and at least one of depth dimension, width dimension, and position in radial direction of the ring concave groove is set to change in a peripheral direction to make contact pressure of the sliding portion on the rotation shaft ununiform in the peripheral direction.

* * * * *